(12) United States Patent
Lee et al.

(10) Patent No.: US 10,637,042 B2
(45) Date of Patent: Apr. 28, 2020

(54) POSITIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Dae-Hoe Lee, Yongin-si (KR);
Do-Hyung Park, Yongin-si (KR);
Yong-Chan You, Yongin-si (KR);
Min-Han Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 42 days.

(21) Appl. No.: 15/487,635

(22) Filed: Apr. 14, 2017

(65) Prior Publication Data
US 2017/0301909 A1    Oct. 19, 2017

(30) Foreign Application Priority Data
Apr. 15, 2016 (KR) .................. 10-2016-0046345

(51) Int. Cl.
| | |
|---|---|
| *H01M 4/131* | (2010.01) |
| *H01M 10/0525* | (2010.01) |
| *H01M 4/525* | (2010.01) |
| *H01M 4/505* | (2010.01) |
| *H01M 4/36* | (2006.01) |
| *H01M 4/62* | (2006.01) |

(52) U.S. Cl.
CPC ........... *H01M 4/131* (2013.01); *H01M 4/366* (2013.01); *H01M 4/505* (2013.01); *H01M 4/525* (2013.01); *H01M 4/62* (2013.01); *H01M 10/0525* (2013.01)

(58) Field of Classification Search
CPC ...... H01M 4/131; H01M 4/366; H01M 4/505; H01M 10/0525
See application file for complete search history.

(56) References Cited

U.S. PATENT DOCUMENTS

| | | | |
|---|---|---|---|
| 2004/0018429 A1 | 1/2004 | Kweon et al. | |
| 2015/0171423 A1* | 6/2015 | Kim ..................... | H01M 4/366 429/220 |

FOREIGN PATENT DOCUMENTS

| | | |
|---|---|---|
| KR | 2002-0087627 A | 11/2002 |
| KR | 10-2014-0118860 A | 10/2014 |
| KR | 10-2015-0090963 A | 8/2015 |

* cited by examiner

*Primary Examiner* — Helen Oi K Conley
(74) *Attorney, Agent, or Firm* — Lee IP Law, PC

(57) ABSTRACT

A positive active material for a rechargeable lithium battery includes a core including a compound represented by Chemical Formula 1 and a structure-stabilizing compound on a surface of the core. The structure-stabilizing compound includes an Al compound or a Co compound. Chemical Formula 1 is $Li_aNi_xCo_yMe_zM^1_kO_{2-p}F_p$ where $0.9 \leq a \leq 1.1$, $0.7 \leq x \leq 0.93$, $0 < y \leq 0.3$, $0 < z \leq 0.3$, $0 \leq k \leq 0.005$, $x+y+z+k=1$, $0 \leq p \leq 0.005$, Me is Mn or Al, and M1 is Mg, Ba, B, La, Y, Ti, Zr, Mn, Si, V, P, Mo, W, or a combination thereof.

4 Claims, 6 Drawing Sheets

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2016-0046345, filed on Apr. 15, 2016, in the Korean Intellectual Property Office, and entitled: "Positive Active Material for Rechargeable Lithium Battery and Rechargeable Lithium Battery Including Same," is incorporated by reference herein in its entirety.

BACKGROUND

1. Field

Embodiments are directed to a positive active material for a rechargeable lithium battery and a rechargeable lithium battery including the same.

2. Description of the Related Art

A rechargeable lithium battery may be used as an actuating power source for a mobile information terminal such as a cell phone, a laptop, a smart phone, and the like.

The rechargeable lithium battery includes a positive electrode, a negative electrode, and an electrolyte. Herein, for a positive active material of a positive electrode may be an oxide consisting of lithium and a transition metal and having a structure capable of intercalating lithium ions, for example $LiCoO_2$, $LiMn_2O_4$, $LiNi_{1-x}Co_xO_2$ (0<x<1).

As for a negative active material, various carbon-based materials such as artificial graphite, natural graphite, and hard carbon, which intercalate and deintercalate lithium ions.

Recently, as the mobile information terminal has been rapidly down-sized and lightened the rechargeable lithium battery as its actuating power source has required much higher capacity. In addition, in order to use the rechargeable lithium battery as an actuating power source or as a power storage source for a hybrid vehicle or an electric vehicle, research on development of a battery having satisfactory high rate capability, being rapidly charged and discharged, and having excellent cycle characteristics is actively made.

SUMMARY

Embodiments are directed to a positive active material for a rechargeable lithium battery including a core including a compound represented by Chemical Formula 1 and a structure-stabilizing compound on a surface of the core. The structure-stabilizing compound includes an Al compound or a Co compound

  [Chemical Formula 1]

wherein, 0.9≤a≤1.1, 0.7≤x≤0.93, 0<y≤0.3, 0<z≤0.3, 0≤k≤0.005, x+y+z+k=1, 0≤p≤0.005, Me is Mn or Al, and $M^1$ is Mg, Ba, B, La, Y, Ti, Zr, Mn, Si, V, P, Mo, W, or a combination thereof.

The structure-stabilizing compound may be $Al_2O_3$, $Co_3O_4$, $Li_aCoO_2$ where a is 0.9 to 1.1, or a combination thereof.

The structure-stabilizing compound may be a Co compound.

The structure-stabilizing compound may be present as a layered phase or as an island shape on the surface of the core.

A content of the structure-stabilizing compound may be about 1.5 wt % to about 3.0 wt % based on 100 wt % of the core.

A surface of the positive active material may have a layered phase crystal structure.

In Chemical Formula 1, x may be in the range 0.8≤x≤0.9.

Embodiments are also directed to a rechargeable lithium battery including a positive electrode including a positive active material as described above, a negative electrode including a negative active material, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
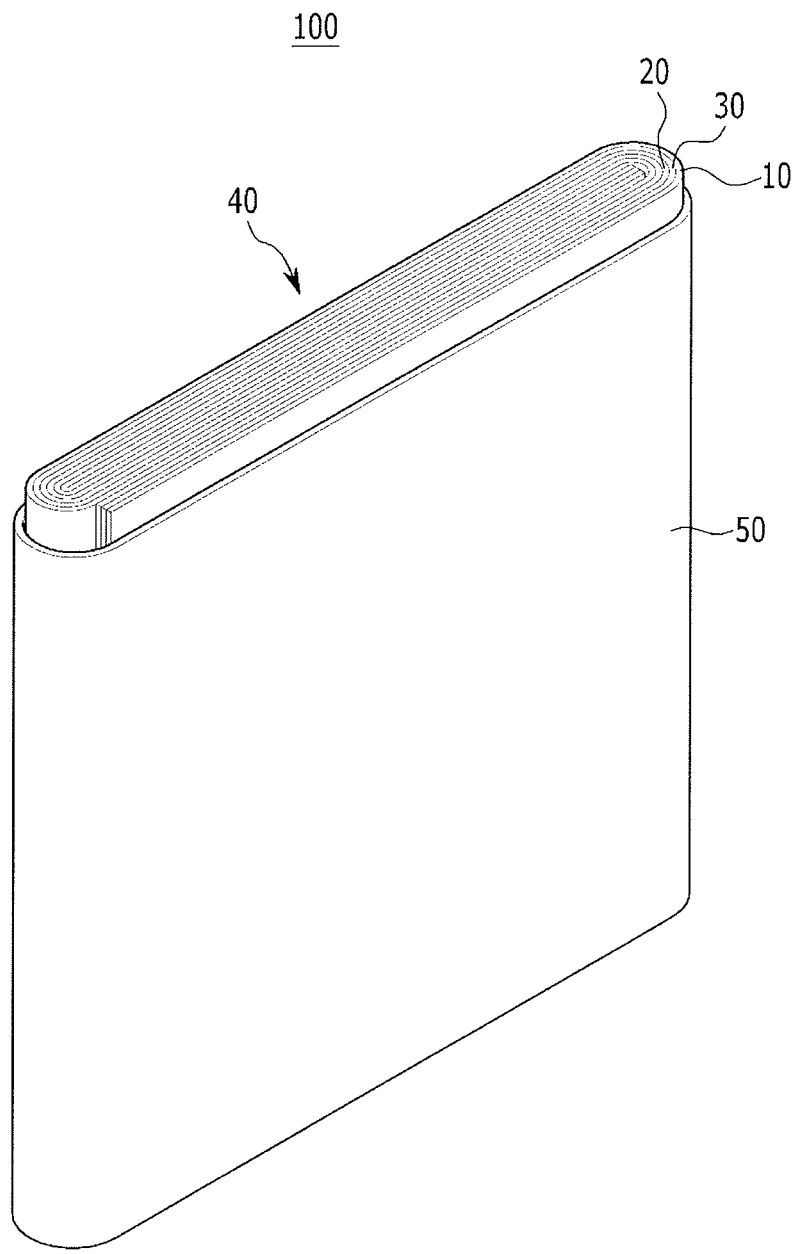
FIG. 1 illustrates a schematic view showing a structure of a positive active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

A positive active material for a rechargeable lithium battery according to an, embodiment includes a core including a compound represented by Chemical Formula 1; and a structure-stabilizing compound disposed on a surface of the core and including an Al compound or a Co compound.

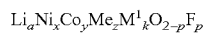  [Chemical Formula 1]

In Chemical Formula 1, 0.9≤a≤1.1, 0.7≤x≤0.93, 0<y≤0.3, 0<z≤0.3, 0≤k≤0.005, x+y+z+k=1, 0≤p≤0.005, Me is Mn or Al, and $M^1$ is Mg, Ba, B, La, Y, Ti, Zr, Mn, Si, V, P, Mo, W, or a combination thereof.

The positive active material has a high nickel content, with x being 0.7 to 0.93. For example, in Chemical Formula 1, x may be in the range, 0.8≤x≤0.9.

Such a compound of Chemical Formula 1 having a high nickel content, for example, with x being 0.7 to 0.93, may be a compound having high capacity. The compound of Chemical Formula 1 where x is 0.7 to 0.93 may have a very high capacity compared with a compound having a low nickel content, for example, a compound where x is less than 0.7.

In Chemical Formula 1, $M^1$ is a doping element that substitutes some of a main element, Ni, Co, and Me constituting the positive active material of Chemical Formula 1. Examples of $M^1$ may be Mg, Ba, B, La, Y, Ti, Zr, Mn, Si, V, P, Mo, or W. In addition, F is fluorine, as a doping element that substitutes a some of oxygen in the positive active material of Chemical Formula 1

The structure-stabilizing compound may be $Al_2O_3$, $Co_3O_4$, $Li_aCoO_2$ (where a is 0.9 to 1.1), or a combination thereof. The structure-stabilizing compound maybe in a form of a layered structure on the surface of the positive active material. Such a structure-stabilizing compound may improve mobility of lithium ions and in addition, may stabilize the structure of the core and thus improve initial efficiency and cycle-life characteristics of the positive active material.

In addition, when a compound core having a high nickel content, that is, a compound core having x ranging from about 0.7 to about 0.93, includes unstable Ni in a higher amount than a compound core having x of less than 0.6 on the surface, an effect provided by the structure-stabilizing compound may be more effectively obtained.

Among the structure-stabilizing compounds, $Li_aCoO_2$ may be formed through a reaction of a Co-containing precursor with Li included on the core and even inside the core when the Co-containing precursor is diffused into the core in the secondary heat-treating process during a process of manufacturing the positive active material. For example, the $Li_aCoO_2$ may be present on the surface of and/or inside the core.

When the $Li_aCoO_2$ is included as a structure-stabilizing compound, a surface layered structure may be well developed, and thus, charge and discharge efficiency and a cycle-life may be improved.

In particular, the structure-stabilizing compound may be a Co compound, for example, $Co_3O_4$, $Li_aCoO_2$, or a mixture of the $Co_3O_4$ and the $Li_aCoO_2$. When the structure-stabilizing compound is the mixture of the $Co_3O_4$ and $Li_aCoO_2$, their mixing ratio may be in a range of greater than about 0 wt %:less than about 100 wt % to about 50:50. When the mixing ratio of the $Co_3O_4$ and the $Li_aCoO_2$ is within the range, a coating process using the Co-containing precursor may be more effectively performed. When the structure-stabilizing compound is a Co compound, Co is more increasingly concentrated on the surface of the positive active material than in the core thereof, and resultantly, Ni may be less concentrated on the surface and may stabilize the surface structure. In addition, when lithium ions are released from the core including a compound represented by Chemical Formula 1 during the charge and discharge, Ni may be oxidized into unstable tetravalent nickel and then, reduced to divalent nickel and thus may form NiO. The Co compound may suppress formation of the NiO and decrease resistance.

The structure-stabilizing compound may be present as a layered phase (a continuous layer type) or an island shape (an non-continuous island type), or as both the layered phase and the island shape on the surface of the core. When the structure-stabilizing compound is present as the layered phase on the surface of the core, the structure-stabilizing compound may be more uniformly present and may provide a Greater effect.

The structure-stabilizing compound may be present on the surface of the core, and thus may reinforce the layer structure of the active material surface. For example, the positive active material may have a layered phase crystal structure on the surface. When the structure-stabilizing compound is present as a layered phase, the active material surface may entirely have a layered phase crystal structure. When the structure-stabilizing compound is present as an island shape, the positive active material may have both a layered phase crystal structure and a mixed phase crystal structure. When the structure-stabilizing compound is present as both layered phase and island shape, both a layered phase crystal structure and a mixed phase crystal structure may be obtained.

A content of the structure-stabilizing compound may be about 1.5 wt % to about 3.0 wt %, or, for example, about 2.0 wt % to about 3.0 wt % based on 100 wt % of the core. When the structure-stabilizing compound is included within the ranges, excellent discharge capacity and cycle-life characteristics, for example, room temperature cycle-life characteristics may be obtained.

The positive active material according to an embodiment may be prepared by the following process.

A lithium-containing compound, a nickel-containing compound, a cobalt-containing compound, and an Me-containing compound may be mixed. Additionally, an $M^1$-containing compound or a fluorine-containing compound may be mixed to prepare a mixture.

The lithium-containing compound may be a lithium acetate, a lithium nitrate, a lithium hydroxide, a lithium carbonate, a lithium acetate, a hydrate thereof, or a combination thereof. The nickel-containing compound may be a nickel nitrate, a nickel hydroxide, a nickel carbonate, a nickel acetate, a nickel sulfate, a hydrate thereof, or a combination thereof. The cobalt-containing compound may be a cobalt nitrate, a cobalt hydroxide, a cobalt acetate, a cobalt carbonate, a cobalt sulfate, a hydrate thereof, or a combination thereof and the Me-containing compound may be an Me-containing nitrate, an Me-containing hydroxide, an Me-containing carbonate, an Me-containing acetate, an Me-containing sulfate, a hydrate thereof, or a combination thereof. The $M^1$-containing compound may be an $M^1$-containing nitrate, an $M^1$-containing hydroxide, an $M^1$-containing carbonate, an $M^1$-containing acetate, $M^1$-containing oxide, an $M^1$-containing sulfate, and the fluorine-containing compound may be a fluorine-containing nitrate, a fluorine-containing hydroxide, a fluorine-containing carbonate, a fluorine-containing acetate, a fluorine-containing sulfate, a fluorine-containing oxide, a hydrate thereof, or a combination thereof.

A mixing ratio of the lithium-containing compound, the nickel-containing compound, the cobalt-containing compound, the Me-containing compound, the $M^1$-containing compound, and the fluorine-containing compound may appropriately be controlled such that the compound of Chemical Formula 1 may be obtained.

The mixture may be subject to a primary heat-treatment to prepare a core. The primary heat-treating process may be performed at about 700° C. to about 1000° C., for about 3 hours to about 20 hours. The primary heat-treating process may be performed under an oxygen $O_2$ atmosphere, or air atmosphere.

The surface of the core may be coated with a precursor of a structure-stabilizing compound. The precursor of a structure-stabilizing compound may be $Al(OH)_3$, $Co(OH)_3$, $Al_2O_3$, $Co_3O_4$, or a combination thereof.

The coating process may be performed in a wet process using a solvent or in a dry process without solvent. The solvent for the wet process may include water, ethyl alcohol, or isopropyl alcohol.

In a process of coating a precursor of a structure-stabilizing compound on the surface of the core, the precursor of a structure-stabilizing compound may be mixed in an amount of about 1.5 wt % to about 3.0 wt % based on 100 wt % of the core.

After the coating process, a secondary heat-treating process may be performed to prepare a positive active material. The secondary heat-treating process may be performed at about 500° C. to about 800° C. for about 5 hours to about 20 hours. When the secondary heat-treating process is performed within the temperature and time ranges, a compound for forming the structure-stabilizing compound may be well diffused onto the surface of the core and may well form the structure-stabilizing compound on the surface of the core.

When $Al(OH)_3$ is used as a precursor of a structure-stabilizing compound, an $Al_2O_3$ structure-stabilizing compound may be formed according to the secondary heat-treating process. When $Co(OH)_3$ is used as a precursor of a structure-stabilizing compound, a part of Co(OH) may be diffused inside the core according to the secondary heat-treating process, and may react with Li included in the core such that $Li_aCoO_2$ may be formed inside the core.

Another embodiment provides a rechargeable lithium battery including the positive electrode including a positive active material, a negative electrode including a negative active material, and an electrolyte.

The positive electrode may include a positive active material layer and a current collector supporting the positive active material. In the positive active material layer, a content of the positive active material may be about 90 wt % to about 98 wt % based on the total amount of the positive active material layer.

In an embodiment, the positive active material layer may further include a binder and a conductive material. The binder and the conductive material may each be included in an amount of about 1 wt % to about 5 wt %, respectively, based on the total amount of the positive active material layer.

The binder improves binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material is included to provide electrode conductivity. A suitable electrically conductive material that does not cause a chemical change may be used as a conductive material. Examples of the conductive material may be a carbon-based material such as natural graphite, artificial graphite, carbon black, acetylene black, ketjen black, a carbon fiber, or the like; a metal-based material in a form of a metal powder or a metal fiber and including copper, nickel, aluminum, silver, or the like; a conductive polymer such as a polyphenylene derivative; or a mixture thereof.

The current collector may be Al, as an example.

The negative electrode may include a current collector and a negative active material layer formed on the current collector. The negative active material layer may include a negative active material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may include a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and is not Sn), or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may include vanadium oxide, lithium vanadium oxide, or the like.

In the negative active material layer, the negative active material may be included in an amount of about 95 wt % to about 99 wt % based on the total weight of the negative active material layer.

In an embodiment, the negative active material layer includes a binder, and optionally, a conductive material. The negative active material layer may include about 1 wt % to about 5 wt % of a binder based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder may include a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from an ethylenepropylene copolymer, polyepichlorohydrine, polyphosphazene, polyacrylonitrile, polystyrene, an ethylenepropylenediene copolymer, polyvinylpyridine, chlorosulfonatedpolyethylene, a latex, a polyester resin, an acrylic resin, phenolic resin, an epoxy resin, polyvinyl alcohol, and a combination thereof.

When the water-soluble binder is used as a negative electrode binder, a cellulose-based compound may be further used as a thickener in order to provide viscosity. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material may be included to provide electrode conductivity. Any suitable electrically conductive material that does not cause chemical chance may be used as a conductive material. Examples of the conductive material include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, as examples.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent include dibutyl ether, tetraglyme, diglyme, dimethoxyethane, 2-methyltetrahydrofuran, tetrahydrofuran, or the like. The ketone-based solvent includes cyclohexanone or the like. The alcohol-based solvent include ethyl alcohol, isopropyl alcohol, or the like. Examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The organic solvent may be used singularly or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate may be mixed together in a volume ratio of about 1:1 to about 1:9. When the mixture is used as an electrolyte, the electrolyte may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 2.

[Chemical Formula 2]

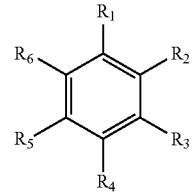

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 3, or propanesultone to improve cycle life.

[Chemical Formula 3]

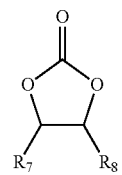

In Chemical Formula 3, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, vinylethylene carbonate, fluoroethylene carbonate, or the like. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example, integers of 1 to 20), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 illustrates an exploded partial perspective view of a rechargeable lithium battery according to an embodiment. The rechargeable lithium battery may one of variously-shaped batteries such as a cylindrical battery, a pouch battery, or the like. For example, as shown in FIG. 1, the rechargeable lithium battery may be a prismatic rechargeable lithium battery.

Referring to FIG. 1, a rechargeable lithium battery 100 according to an embodiment may include an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30. The case may be sealed, for example, by a cover or cap or other form of sealing member, depending on the type of rechargeable lithium battery. Electrode tabs or terminals electrically connected to the positive electrode 10 and the negative electrode 20, respectively, may be outside the case.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXPERIMENTAL EXAMPLE 1

Lithium carbonate, nickel sulfate, cobalt sulfate, and manganese sulfate were mixed to have a mole ratio of Li:Ni:Co:Mn=1:0.5:0.2:0.3.

The mixture was heat-treated at 740° C. under an oxygen ($O_2$) atmosphere for 20 hours to prepare a $LiNi_{0.5}Co_{0.2}Mn_{0.3}O_2$ positive active material.

94 wt % of the prepared positive active material, 3 wt % of a polyvinylidene fluoride binder, and 3 wt % of a ketjen black conductive material were mixed or dissolved in an N-methylpyrrolidone solvent to prepare a positive active material composition. The positive active material composition was coated onto an Al current collector to manufacture a positive electrode.

EXPERIMENTAL EXAMPLE 2

A $LiNi_{0.6}Co_{0.2}Mn_{0.2}O_2$ positive active material was prepared according to the same method as Experimental Example 1 except for mixing lithium carbonate, nickel sulfate, cobalt sulfate, and manganese sulfate to have a mole ratio of Li:Ni:Co:Mn=1:0.6:0.2:0.2. The positive active material was used according to the same method as Experimental Example 1 to manufacture a positive electrode.

EXPERIMENTAL EXAMPLE 3

A $LiNi_{0.7}Co_{0.15}Mn_{0.15}O_2$ positive active material was prepared according to the same method as Experimental Example 1 except for mixing lithium hydroxide, nickel sulfate, cobalt sulfate, and manganese sulfate to have a mole ratio of Li:Ni:Co:Mn=1:0.7:0.15:0.15. The positive active material was used according to the same method as Experimental Example 1 to manufacture a positive electrode.

EXPERIMENTAL EXAMPLE 4

A $LiNi_{0.8}Co_{0.15}Al_{0.05}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.8:0.15:0.05. The positive active material was used according to the same method as Experimental Example 1 to manufacture a positive electrode.

EXPERIMENTAL EXAMPLE 5

A $LiNi_{0.82}Co_{0.15}Al_{0.03}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.82:0.15:0.03. The positive active material was used according to the same method as Experimental Example 1 to manufacture a positive electrode.

EXPERIMENTAL EXAMPLE 6

A $LiNi_{0.85}Co_{0.135}Al_{0.015}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.85:0.135:0.015. The positive active material was used according to the same method as Experimental Example 1 to manufacture a positive electrode.

EXPERIMENTAL EXAMPLE 7

A $LiNi_{0.9}Co_{0.09}Al_{0.01}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.9:0.09:0.01. The positive active material was used according to the same method as Experimental Example 1 to manufacture a positive electrode.

EXPERIMENTAL EXAMPLE 8

A $LiNi_{0.92}Co_{0.07}Al_{0.01}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.92:0.07:0.01. The positive active material was used according to the same method as Experimental Example 1 to manufacture a positive electrode.

Each positive electrode according to Experimental Examples 1 to 8, a lithium metal counter electrode, and an electrolyte were used to manufacture a coin-type half-cell in a general method. The electrolyte was prepared by dissolving 1.0 M $LiPF_6$ in a mixed solvent of ethylene carbonate and diethyl carbonate (50:50 volume ratio).

The half-cell was charged and discharged at 25° C. within a range of 3.0 V to 4.3 V at 0.2 C. Then, the discharge capacity of the half-cell was measured. The results for Experimental Examples 1 to 8 are provided in FIG. 2. (The circles in FIG. 2 correspond to Experimental Examples 1 to 8 in order, from left to right.)

Figure 2:
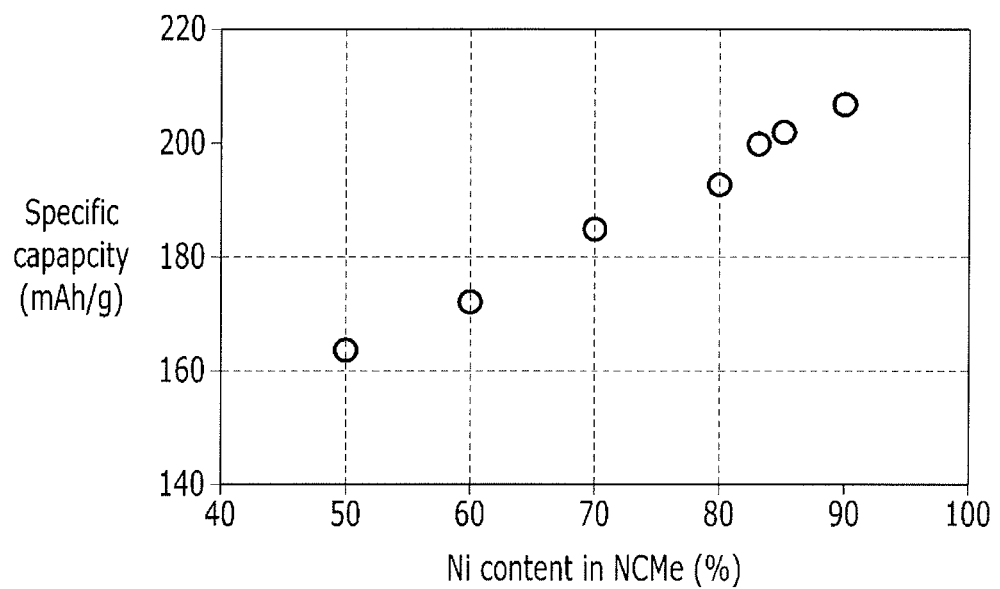
FIG. 2 illustrates a graph showing discharge capacity results of half cells using the positive electrodes according to Experimental Examples 1 to 8.

As shown in FIG. 2, as a nickel content was increased, capacity was increased. For example, when x in a $Li_aNi_xCo_yMn_zO_2$ compound was greater than or equal to 0.7 (greater than or equal to 70% in FIG. 2), a capacity greater than or equal to 180 mAh/g was obtained.

EXAMPLE 1

Lithium hydroxide, nickel sulfate, cobalt sulfate, and aluminum sulfate were mixed to have a mole ratio of Li:Ni:Co:Al:Ti=1:0.85:0.135:0.015.

The mixture was primarily heat-treated at 740° C. under an oxygen ($O_2$) atmosphere for 20 hours to prepare a $LiNi_{0.85}Co_{0.135}Al_{0.015}O_2$ core.

The core was mixed with $Co(OH)_2$ in a ratio of 100 wt %:1.5 wt % in a water solvent in a wet coating process, and the mixture was secondarily heat-treated at 700° C. under an oxygen atmosphere for 10 hours to prepare a positive active material including the $LiNi_{0.85}Co_{0.135}Al_{0.015}O_2$ core and a $Co_3O_4$ and $Li_aCoO_2$ (50:50 wt %, a=1.0) structure-stabilizing compound on the surface of the core. The $Co_3O_4$ and $Li_aCoO_2$ structure-stabilizing compound was present as an island shape and a layered phase on the surface of the core. In addition, the structure-stabilizing compound was present in an amount of 1.5 wt % based on 100 wt % of the core in the final positive active material.

94 wt % of the prepared positive active material, 3 wt % of a polyvinylidene fluoride binder, and 3 wt % of a ketjen black conductive material were mixed or dissolved in an N-methylpyrrolidone solvent to prepare a positive active material composition. The positive active material composition was coated onto an Al current collector to manufacture a positive electrode.

EXAMPLE 2

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Al_{0.015}O_2$ core of Example 1 with $Co(OH)_2$ in a ratio of 100 wt %:2 wt %. In the final positive active material, the structure-stabilizing compound was present in an amount of 2 wt % based on 100 wt % of the core.

A positive electrode was manufactured using the positive active material according to the same method as in Example 1.

EXAMPLE 3

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Al_{0.015}O_2$ core of Example 1 with $Co(OH)_2$ in a ratio of 100 wt %:3 wt %. In the positive active material, the structure-stabilizing compound was present in an amount of 3 wt % based on 100 wt % of the core.

A positive electrode was manufactured using the positive active material according to the same method as in Example 1.

REFERENCE EXAMPLE 1

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Al_{0.015}O_2$ core of Example 1 with $Co(OH)_2$ in a ratio of 100 wt %:0.5 wt %. In the final positive active material, the structure-stabilizing compound was present in an amount of 0.5 wt % based on 100 wt % of the core.

A positive electrode was manufactured using the positive active material according to the same method as in Example 1.

REFERENCE EXAMPLE 2

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Al_{0.015}O_2$ core of Example 1 with $Co(OH)_2$ in a ratio of 100 wt %:1 wt %. In the final positive active material, the structure-stabilizing compound was present in an amount of 1 wt % based on 100 wt % of the core.

A positive electrode was manufactured using the positive active material according to the same method as in Example 1.

REFERENCE EXAMPLE 3

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Al_{0.015}O_2$ core of Example 1 with $Co(OH)_2$ in a ratio of 100 wt %:5 wt %. In the final positive active material, the structure-stabilizing compound was present in an amount of 5 wt % based on 100 wt % of the core.

A positive electrode was manufactured using the positive active material according to the same method as in Example 1.

Evaluation of Surface Characteristics

Figure 3:
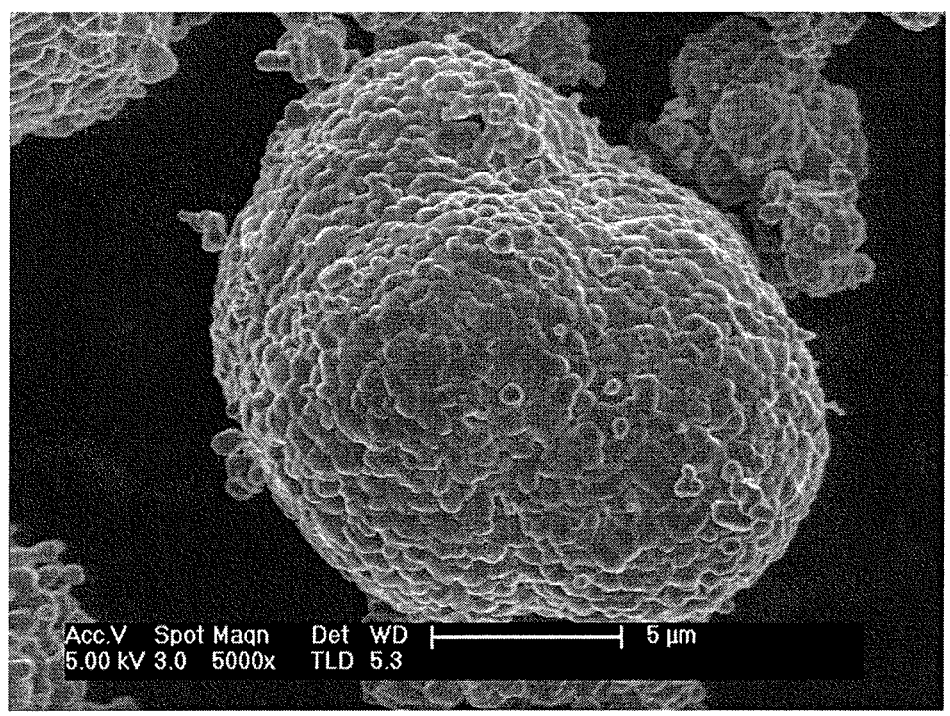
FIG. 3 illustrates a SEM image showing the positive active material according to Example 1.

FIG. 3 illustrates a SEM image showing the positive active material of Example 1. As shown in FIG. 3, the positive active material of Example 1 has a Co-including structure-stabilizing compound coated as an island shape and a layered phase on the surface of the core.

Figure 4:
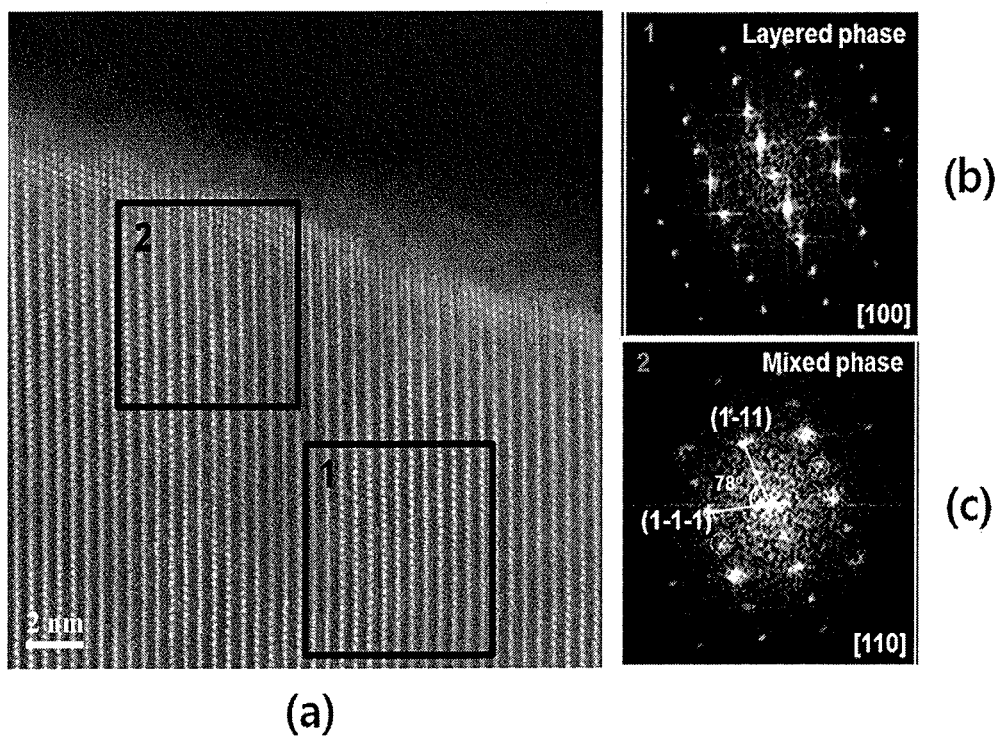
FIG. 4 illustrates TEM and SAD (selected area diffraction) images showing the positive active material according to Example 1.

FIG. 4(a) illustrates a TEM image showing the positive active material of Example 1, FIG. 4(b) illustrates a SAD (selected area diffraction) image showing the surface corresponding to area 1 in FIG. 4(a), and FIG. 4c) of FIG. 4 illustrates a SAD (selected area diffraction) image showing the surface corresponding to area 2 in (FIG. 4a). As shown in FIGS. 4(b) and 4(c), the surface of the positive active material of Example 1 had a layered crystal structure and a mixed crystal structure.

Evaluation of Battery Characteristics

Each positive electrode according to Examples 1 to 3 and Reference Examples 1 to 3, a lithium metal counter electrode, and an electrolyte were used to manufacture in a coin-type half-cell in a general method. The electrolyte was prepared by dissolving 1.3 M $LiPF_6$ in a mixed solvent of ethylene carbonate and diethyl carbonate (50:50 volume ratio).

The manufactured half-cell was charged and discharged 50 times at 25° C. in a range of 3.0 V to 4.3 V at 0.2 C, and discharge capacity of the half-cell was measured. In addition, a capacity retention was obtained by calculating a ratio of the 50th discharge capacity relative to the first discharge capacity as a cycle-life.

The results of the half-cells respectively using the positive electrodes according to Examples 1 to 3 and Reference Examples 1 to 3 are shown in Table 1. In addition, the discharge capacity results of the half-cells respectively using the positive electrodes according to Examples 1 to 3 and Reference Examples 1 to 3 are shown in FIG. 5, and room temperature cycle-life characteristic results of the half-cells are shown in FIG. 6.

TABLE 1

|  | Content of structure-stabilizing compound (wt %) | Discharge capacity (mAh/g) | Room temperature cycle-life (%) |
|---|---|---|---|
| Reference Example 1 | 0.5 | 200 | 84 |
| Reference Example 2 | 1 | 200 | 84 |
| Example 1 | 1.5 | 200 | 85 |
| Example 2 | 2 | 201 | 86 |
| Example 3 | 3 | 201 | 87 |
| Reference Example 3 | 5 | 199 | 83 |

Figure 5:
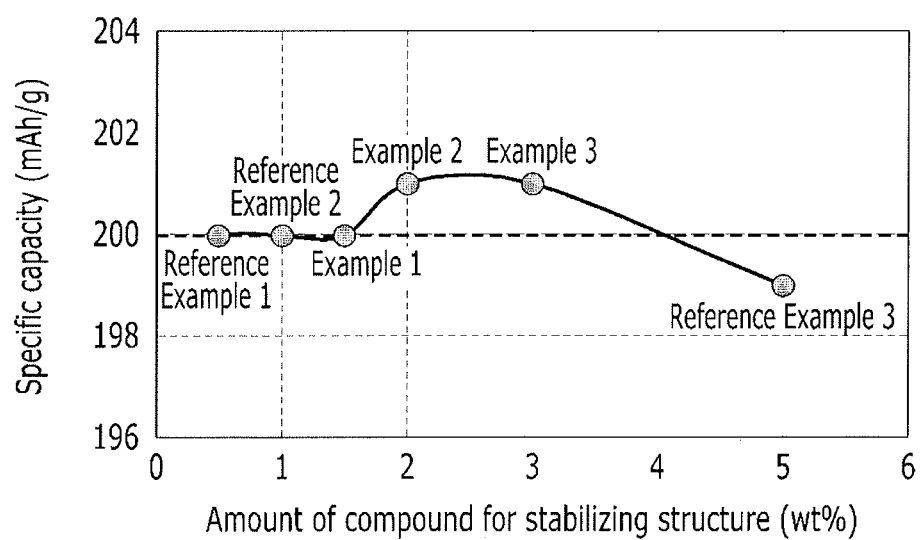
FIG. 5 illustrates a graph showing discharge capacity results of half cells using the positive electrodes according to Examples 1 to 3 and Reference Examples 1 to 3.
Figure 6:
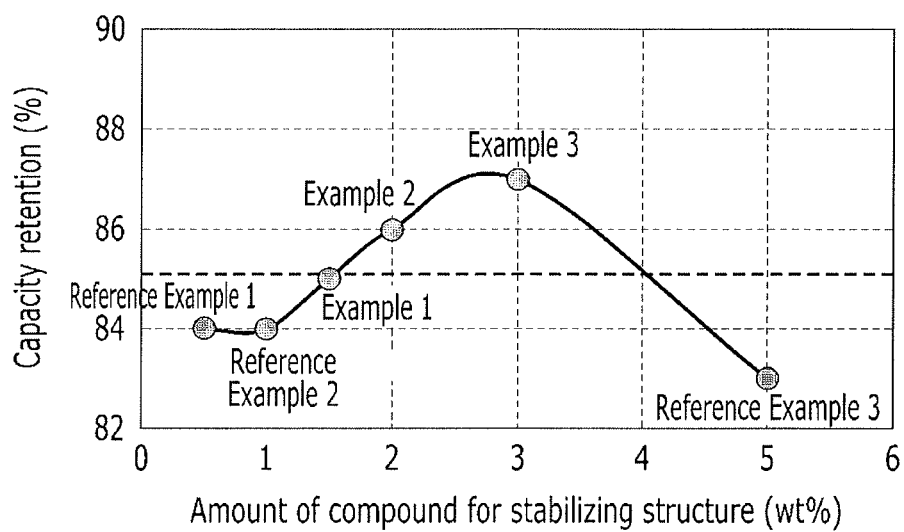
FIG. 6 illustrates a graph showing room temperature cycle-life characteristic results of half cells using the positive electrodes according to Examples 1 to 3 and Reference Examples 1 to 3.

As shown in Table 1 and FIGS. 5 and 6, the half-cells respectively using the positive electrodes using a positive active material including $Co_3O_4$ and $Li_1CoO_2$ as a structure-stabilizing compound in a range of 1.5 wt % to 3 wt % according to Examples 1 to 3 exhibited discharge capacity of greater than or equal to 200 mAh/g and cycle-life characteristics of greater than or equal to 85%. The half-cells including the structure-stabilizing compound in a smaller amount than the range according to Reference Examples 1 and 2 and the half-cells including the structure-stabilizing compound in a larger amount than the range according to REFERENCE EXAMPLE 3 exhibited deteriorated capacity and cycle-life characteristics.

COMPARATIVE EXAMPLE 1

Lithium hydroxide, nickel sulfate, cobalt sulfate, and aluminum sulfate were mixed to have a mole ratio of Li:Ni:Co:Al=1:0.85:0.135:0.015.

The mixture was subjected to a primary heat treatment at 740° C. under an oxygen ($O_2$) atmosphere for 20 hours to prepare a $LiNi_{0.85}Co_{0.135}Al_{0.015}O_2$ positive active material. A positive electrode was manufactured using the positive active material according to the same method as in Example 1.

Evaluation of Battery Characteristics (Example 1 and Comparative Example 1)

Each positive electrode according to Example 1 and Comparative Example 1, a lithium metal counter electrode, and an electrolyte were used to manufacture a coin-type half-cell in a general method. The electrolyte was prepared by dissolving 1.3 M $LiPF_6$ in a mixed solvent of ethylene carbonate and diethyl carbonate (50:50 volume ratio).

The half-cells were charged and discharged once at 0.1 C in a range of 2.8 V to 4.4 V with a current density of 3.0 mA/cm$^2$ to perform a formation process. The charge and discharge capacities and efficiencies of the half-cells were measured, and the results are shown in Table 2.

After the formation process, the cells were charged and discharged once at 0.2 C in a range of 2.8 V to 4.4 V with a current density of 3.0 mA/cm$^2$. The discharge capacities of the half cells were measured, and the results are shown in Table 2.

TABLE 2

|  | Formation process | | | |
|---|---|---|---|---|
|  | 0.1C charge capacity (mAh/g) | 0.1C discharge capacity (mAh/g) | Efficiency (%) | 0.2 C discharge capacity (mAh/g) |
| Comparative Example 1 | 234.9 | 209.1 | 89.0 | 202.8 |
| Example 1 | 235.7 | 212.6 | 90.2 | 207.6 |

As shown in Table 2, the positive active material having a structure-stabilizing compound on the surface according to Example 1 exhibited excellent charge and discharge characteristics compared with the positive active material including no structure-stabilizing compound according to Comparative Example 1.

EXAMPLE 4

Lithium hydroxide, nickel sulfate, cobalt sulfate, and manganese sulfate were mixed to have a mole ratio of Li:Ni:Co:Mn=1:0.85:0.135:0.015.

The mixture was subjected to a primary heat-treatment at 740° C. under an oxygen ($O_2$) atmosphere for 20 hours to prepare a $LiNi_{0.85}Co_{0.135}Mn_{0.015}O_2$ core.

The core was mixed with $Co(OH)_2$ in a ratio of 100 wt %:1.5 wt % in a water solvent through a wet coating process, this mixture was subjected to a secondary heat-treatment at 700° C. under an oxygen atmosphere for 10 hours to prepare a positive active material including the $LiNi_{0.85}Co_{0.135}Mn_{0.015}O_2$ core and a $Co_3O_4$ and $Li_aCoO_2$ (50:50 wt %, a=1.0) structure-stabilizing compound on the surface of the core. The $Co_3O_4$ and $Li_aCoO_2$ structure-stabilizing compound was present as an island shape and a layered phase on the surface of the core. In addition, in the final positive active material, the structure-stabilizing compound was included in an amount of 1.5 wt % based on 100 wt % of the core.

94 wt % of the prepared positive active material, 3 wt % of a polyvinylidene fluoride binder, and 3 wt % of a ketjen black conductive material were mixed or dissolved in an N-methylpyrrolidone solvent to prepare a positive active material composition. The positive active material composition was coated onto an Al current collector to manufacture a positive electrode.

EXAMPLE 5

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Mn_{0.015}O_2$ core of Example 4 with $Co(OH)_2$ in a ratio of 100 wt %:2 wt %. In the final positive active material, the structure-stabilizing compound was present in an amount of 2 wt % based on 100 wt % of the core.

A positive electrode was manufactured using the positive active material according to the same method as in Example 1.

EXAMPLE 6

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Mn_{0.015}O_2$ core of Example 4 with $Co(OH)_2$ in a ratio of 100 wt %:3 wt %. In the final positive active material, the structure-stabilizing compound was present in an amount of 3 wt % based on 100 wt % of the core.

A positive electrode was manufactured using the positive active material according to the same method as in Example 1.

REFERENCE EXAMPLE 4

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Mn_{0.015}O_2$ core of Example 4 with $Co(OH)_2$ in a ratio of 100 wt %:0.5 wt %. In the final positive active material, the structure-stabilizing compound was present in an amount of 0.5 wt % based on 100 wt % of the core.

A positive electrode was manufactured using the positive active material according to the same method as in Example 1.

REFERENCE EXAMPLE 5

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Mn_{0.015}O_2$ core of Example 4 with $Co(OH)_2$ in a ratio of 100 wt %:1 wt %. In the positive active material, the structure-stabilizing compound was present in an amount of 1 wt % based on 100 wt % of the core.

A positive electrode was manufactured using the positive active material according to the same method as in Example 1.

REFERENCE EXAMPLE 6

A positive active material including a core and a $Co_3O_4$ and $Li_aCoO_2$ (50:50 wt %, a=1.0) structure-stabilizing compound on the surface of the core was prepared according to the same method as Example 1 except for mixing the $LiNi_{0.85}Co_{0.135}Mn_{0.015}O_2$ core of Example 4 with $Co(OH)_2$ in a ratio of 100 wt %:5 wt %. In the final positive active material, the structure-stabilizing compound was present in an amount of 5 wt % based on 100 wt % of the core.

A positive electrode was manufactured using the positive active material according to the same method as in Example 1.

Evaluation of Battery Characteristics (Examples 4 to 6 and Reference Examples 4 to 6)

Each positive electrode according to Examples 4 to 6 and Reference Examples 4 to 6, a lithium metal counter electrode, and an electrolyte were used to manufacture a coin-type half-cell in a general method. The electrolyte was prepared by dissolving 1.3 M $LiPF_6$ in a mixed solvent of ethylene carbonate and diethyl carbonate (50:50 of a volume ratio).

The manufactured half-cells were charged and discharged 50 times at 25° C. in a range of 3.0 V to 4.3 V at 0.2 C, and the discharge capacities of the half-cells were measured. In addition, a capacity retention value was obtained by calculating a ratio of the 50th discharge capacity relative to the first discharge capacity to evaluate a cycle-life.

The results with respect to the half-cells manufactured by respectively using the positive electrodes according to Examples 4 to 6 and Reference Examples 4 to 6 were shown in Table 3.

TABLE 3

| | Content of structure-stabilizing compound (wt %) | Discharge capacity (mAh/g) | Room temperature cycle-life (%) |
|---|---|---|---|
| Reference Example 4 | 0.5 | 200 | 84 |
| Reference Example 5 | 1 | 200 | 84 |
| Example 4 | 1.5 | 201 | 86 |
| Example 5 | 2 | 202 | 87 |
| Example 6 | 3 | 202 | 87 |
| Reference Example 6 | 5 | 199 | 83 |

As shown in Table 3, the half-cells using the positive electrodes using the positive active material including $Co_3O_4$ and $Li_aCoO_2$ in an amount of 1.5 wt % to 3 wt % as a structure-stabilizing compound according to Examples 4 to 6 showed discharge capacity of greater than or equal to 200 mAh/g and cycle-life characteristics of greater than or equal to 85%, while the half-cells including the structure-stabilizing compound in a smaller amount than the range according to Reference Examples 4 and 5 and the half-cells including the structure-stabilizing compound in a larger amount than the range according to REFERENCE EXAMPLE 6 exhibited deteriorated cycle-life characteristics.

COMPARATIVE EXAMPLE 2

Lithium hydroxide, nickel sulfate, cobalt sulfate, and manganese sulfate were mixed to have a mole ratio of Li:Ni:Co:Mn=1:0.85:0.135:0.015.

The mixture was subjected to primary heat-treatment at 740° C. under an oxygen ($O_2$) atmosphere for 20 hours to prepare a $LiNi_{0.85}Co_{0.135}Mn_{0.015}O_2$ positive active material. A positive electrode was manufactured using the positive active material according to the same method as in Example 1.

Evaluation of Battery Characteristics (Example 4 and Comparative Example 2)

Each positive electrode according to Example 4 and Comparative Example 2, a lithium metal counter electrode, and an electrolyte were used to manufacture a coin-type half-cell in a general method. The electrolyte was prepared by dissolving 1.3 M $LiPF_6$ in a mixed solvent of ethylene carbonate and diethyl carbonate (50:50 volume ratio).

The manufactured half-cells were charged and discharged once at 0.1 C in a range of 2.8 V to 4.4 V with a current density of 3.0 mA/cm² to perform a formation process. The charge and discharge capacities and efficiencies of the half-cells were obtained, and the results are shown in Table 4.

In addition, after the formation process, the cells were charged and discharged once at 0.2 C in a range of 2.8 V to 4.4 V with a current density of 3.0 mA/cm$^2$. The discharge capacities of the half-cells were obtained, and the results are shown in Table 4.

TABLE 4

|  | Formation process | | | |
| --- | --- | --- | --- | --- |
|  | 0.1C charge capacity (mAh/g) | 0.1C discharge capacity (mAh/g) | Efficiency (%) | 0.2 C discharge capacity (mAh/g) |
| Comparative Example 2 | 235.5 | 209.5 | 88.9 | 202.5 |
| Example 4 | 236.5 | 212.5 | 89.9 | 207.5 |

As shown in Table 4, the positive active material having the structure-stabilizing compound on the surface according to Example 4 showed excellent charge and discharge characteristics compared with the positive active material including no structure-stabilizing compound according to Comparative Example 2.

By way of summation and review, a rechargeable lithium battery includes a positive electrode, a negative electrode, and an electrolyte. A positive active material of a positive electrode may be an oxide including lithium and a transition metal and having a structure capable of intercalating lithium ions. For example, the positive active material may be $LiCoO_2$, $LiMn_2O_4$, or $LiNi_{1-x}Co_xO_2$ (0<x<1).

As for a negative active material, various carbon-based materials such as artificial graphite, natural graphite, and hard carbon, which intercalate and deintercalate lithium ions.

Recently, as mobile information terminals have been rapidly down-sized and made lighter, it has become desirable for a rechargeable lithium battery as an actuating power source to have a much higher capacity. In addition, in order to use the rechargeable lithium battery as an actuating power source or as a power storage source for a hybrid vehicle or an electric vehicle, research on developing a battery having a satisfactory high rate capability, an ability to be rapidly charged and discharged, and excellent cycle characteristics is being actively conducted.

Embodiments provide a positive active material for a rechargeable lithium battery having high capacity and excellent cycle-life characteristics.

Embodiment provide a rechargeable lithium battery including the positive active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A positive active material for a rechargeable lithium battery, the positive active material comprising:
   a core including a compound represented by Chemical Formula 1; and
   a structure-stabilizing compound on a surface of the core, the structure-stabilizing compound being $Co_3O_4$, $Li_aCoO_2$ where a is 0.9 to 1.1, or a combination thereof, and wherein the structure-stabilizing compound is present as a continuous layer on the surface of the core $$Li_aNi_xCo_yMe_zM^1_kO_{2-p}F_p \qquad \text{[Chemical Formula 1]}$$

wherein, $0.9 \leq a \leq 1.1$, $0.7 \leq x \leq 0.93$, $0 < y \leq 0.3$, $0 < z \leq 0.3$, $0 \leq 0.005$, $x+y+z+k = 1$, $0 \leq p \leq 0.005$,
   Me is Mn or Al, and
   $M^1$ is Mg, Ba, B, La, Y, Ti, Zr, Mn, Si, V, P, Mo, W, or a combination thereof, wherein a content of the structure-stabilizing compound is about 1.5 wt % to about 3.0 wt % based on 100 wt % of the core.

2. The positive active material as claimed in claim 1, wherein a surface of the positive active material has a layered phase crystal structure.

3. The positive active material as claimed in claim 1, wherein x is in the range $0.8 \leq x \leq 0.9$.

4. A rechargeable lithium battery, comprising
   a positive electrode including a positive active material as claimed in claim 1;
   a negative electrode including a negative active material; and
   an electrolyte.

* * * * *